INVENTOR.
Reynold A. Powell

Patented Apr. 3, 1945

2,372,738

UNITED STATES PATENT OFFICE 2,372,738

LAMINATING METHOD

Reginald A. Powell, Van Nuys, Calif., assignor to Timm Aircraft Corporation, Van Nuys, Calif., a corporation of California Application November 24, 1939, Serial No. 305,765

8 Claims. (Cl. 144—309)

My invention has to do with plastics, particularly of the synthetic resin group, and with the manufacture of articles or bodies in which synthetic resins are used for laminating, molding, impregnating, surfacing or other manufacturing steps.

While the invention is far reaching in its diverse applications it is a particular object of the invention to provide an efficient and economical method for the manufacture of large curved-surfaced hollow bodies, in the construction of which phenolic or like heat-hardening plastics are specified or desirable, such as airplane fuselages, wings and the like.

It is recognized that of the many cold glues, "organic glasses," thermo-plastics and the like, the phenolic resins and particularly phenol-aldehyde condensation products are most desirable in the matter of final strength and resistance to heat and the elements and that thermo-plastics promise to play an important part in the manufacture of large airplane structural elements. For strength and economy the preferred construction is that of laminated wood rather than all plastic or plastic impregnated fabrics.

The construction of large laminated bodies composed solely or in part of phenolic resin or other heat-hardening resins presents great problems in the matter of high initial equipment cost and close control of heat and pressure in the molds. This is particularly true where the parts are of generally semicircular section and tend to receive less mold pressure at some points than at others. It is an object of this invention to provide for treating thermo-plastic compositions and particularly laminated constructions so that they are subject to even distribution of pressure and even application of heat regardless of their shape, and without resort to the extremely elaborate and costly heated molds ordinarily required in producing laminated structures with thermo-plastic binders.

Another object of this invention is to provide that laminated structures may be built up by the well known and well developed cold methods and be then treated to have all the advantages of having been made with heat-hardening resins in the aforesaid type of heated molds.

Another and equally important object of the invention is the provision of a cement or glue having the combined advantages of the cold glues and of the phenol-aldehyde condensation products without many of the disadvantages of same.

While my invention is not confined to any particular article or body or to specific manufacturing processes and while it involves the use of a new composition of matter which I have discovered, the invention is well set forth by a description of a new method for the manufacture of airplane fuselages using laminated wood and one form of my new composition of matter.

In the accompanying drawing.

Figure 1:
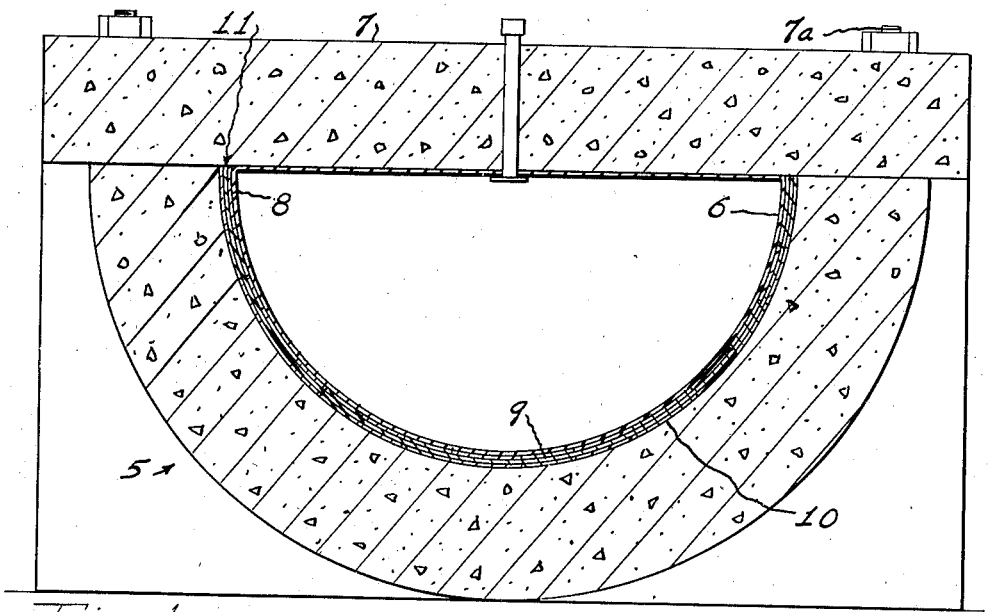
Figure 1 is a vertical sectional schematic view of an inexpensive and very effective mold in which the first steps of the manufacture of a laminated fuselage are carried out.

In carrying out my invention I provide that which is hereinafter termed the glue, in a form which under ordinary conditions behaves like the well known cold glues or air-setting resins in that laminated bodies may be first built up with the aid of this glue apart from heat.

The glue which I provide is one which will set in a reasonable time, such as to allow for initial fabrication, without the aid of heat and which when the laminated product is initially fabricated will permit of final setting under pressure and without heat. The invention provides for control over the time required for the glue to set. Said glue however, while having the properties of many effective cold glues and while providing suitable strength under cold setting conditions is nevertheless heat-hardening and when subjected to heat manifests the increased strength and resistance and the non-heat-softening properties now found only in the phenolic resins.

In producing such a glue I produce or provide a condensation product of phenol-aldehyde and in fact I may employ for this purpose any suitable and well known phenolic heat-hardening resin such as that now employed in the manufacture of laminated or impregnated hot-pressed bodies. Again instead of the usual phenolic resin I may employ other synthetic resins having similar and suitable properties of which several are in use and each have certain peculiarly advantageous properties under certain conditions.

Further I provide a cold setting glue which is compatible with the aforesaid type of resins and with the heat-hardening resin with which the cold setting glue is to be employed. Such cold setting glue is preferably the well known urea-aldehyde condensation product generally known as urea resin and which is used with a small percent, such as 2%, of well known accelerators or hardeners to time and insure final setting. There are however other resins related to the urea resins which may be used.

These I mix together with water; one formula being 100 parts of phenolic resin by weight, one hundred parts of the dry urea resin including about 2% of the usual hardener, and 100 parts of water. Other proportions are also used for certain purposes as will appear hereinafter. These may be mixed by first diluting the fluid phenolic resin with the water and then stirring in the dry urea glue until the latter is completely dissolved. I find it important to promote the final step by using water at about the same temperature as that of the phenol resin solution and controlling admixture and stirring under conditions to promote a clear final fluid and to discourage coagulation or apparent cloudiness of the product.

The mold which I employ for building airplane fuselages and the like is shown in the drawings and indicated by the reference numeral 5. This may be a simple concrete mold having a suitably smooth inside surface and while it shall withstand certain internal or bursting stress it is nevertheless quite inexpensive and readily constructed.

In connection with this mold I provide a pneumatic inflator or rubber bag 6 which is adapted to be inflated within the mold and under the cover 7 of same to exert a uniform pressure throughout all areas.

In the construction of a half section of a fuselage, for example, thin strips of wood are built up in two or more layers within the mold, the strips being here indicated by the reference numerals 8, 9 and 10 respectively. This step may be carried out much in the way it was formerly done with casein glue except that in this method the aforesaid new glue is employed.

This glue, since it is subject to air drying, is handled much like other glues and thereby attains one of the objects of the invention in enabling workmen to follow long established and accepted methods of fabrication. While air-conditioning of the work space is best for control of the glue characteristics it so happens that should this glue tend to harden or set too rapidly an occasional application of a moistened cloth to the glue line will retard setting.

When the strips have been laminated in any usual method with the glue having been applied to the contacting surfaces, the inflator 6 is placed as shown in Figure 1, the cover 7 is applied and suitably held down and the bag is inflated to a suitable pressure to hold all material under predetermined pressure thruout all areas. In this way ample pressure may be applied while the glue is taking a cold set. It is a characteristic of the glue that it adapts itself to the time required and yet when the bag 6 is inflated it is still sufficiently flexible to adapt itself to the increased pressure and to cause uniform adhesion and distribution of such adhesion throughout the entire areas. My process includes final heat-hardening and by way of pointing out the advantages to be gained with the present invention attention is called to the fact that inflators of the type shown are not adapted for use under the relatively high temperatures at which heat-hardening glues are required to be finally treated. The usual rigid member used in hot processes in place of the bag 6 does not provide for proper application of radial pressure to those portions of a semi-circumferential form which extend more vertically than horizontally while there is often a tendency for undue pressure near the bottom of such a shape and insufficient pressure at the sides. This particularly is the case where a laminated construction is employed for the laminated material is static and will not flow or deform like thermo-plastic compositions. The laminated products fabricated with phenolic resins and the like have the advantage of a definite reenforcement provided by the laminated material while the thermo-plastic material is sufficient in amount to provide the required final characteristics.

After the laminations have remained under the uniformly imposed pressure of the inflator for the proper time interval the glue, not withstanding the presence of the phenolic ingredient is found to have set and to have acquired a cold strength which under test shows it to be superior, as a cold glue to many of common used cold glues. In fact, I find it to be 10% stronger than the best casein glues used heretofore in the manufacture of laminated bodies in the well known methods.

Figure 2:
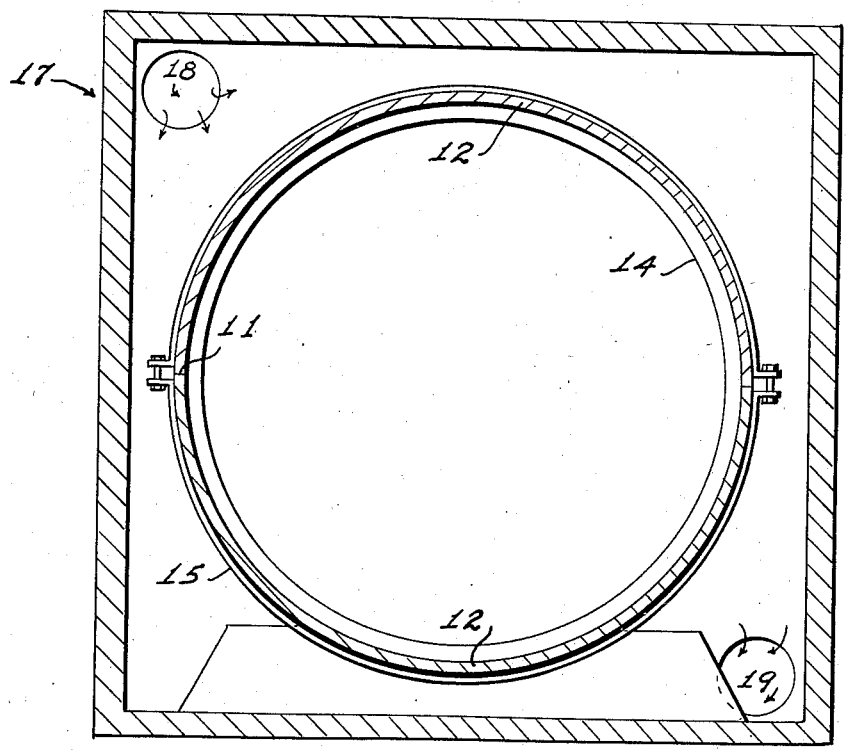
Figure 2 is a similar view showing the product of the aforesaid mold having been transferred to and being treated finally in an inexpensive heat-treating compartment or oven.

Therefore, the cold glued form or product is suited for handling or use altho it has not yet attained the final strength and stability which the invention seeks. The semi-circumferential part or half of the airplane fuselage is now suitably trimmed at edges such as 11 so that two such products 12, 12 may be placed edge to edge to form a full hollow body or fuselage. In Figure 2 three original laminations and glue are shown as having formed a single body 12, and while this may not be literally the case the drawing illustrates the partially finished products in this manner to indicate that the original laminations have become substantially integral each with the others. In the particular method being now described these two halves are assembled around the usual bulkhead rings such as indicated at 14. In this way a complete re-enforced fuselage is built up. In placing the halves or sections on the bulkhead rings a glue conforming to this invention is employed altho for this particular step it may be compounded to give a quicker cold set as less time is required to assemble two halves around a set of bulkheads. The glue used for this purpose preferably contains a higher percentage of the urea or cold glue, as will appear more particularly hereinafter.

To place the bulkhead rings under compression and to firmly hold the pre-formed sections in contact therewith, any usual expedient may be employed according to the art of gluing; this drawing showing common metal straps 15 as being cinched around the assembly. These hold the entire assembly in such form that glue previously applied to the bulkhead rings sets and forms a complete cold-glued fuselage.

Preferably while the straps are in place, but only after the cold glue used on the rings shall have taken a suitable initial set, the entire assembly is moved into the oven 17. This may be of any common type, preferably the convector type, which unlike a heated mold permits of circulating heated air around and thru the form to provide close temperature control thruout the entire mass, and if desired, close control of the atmosphere in which this final step is carried out.

The heat of the oven is sufficient to promote the usual heat hardening effect required to be given phenolic resins or the like and in carrying out my invention the unexpected result obtained, despite the presence of a pre-set cold glue is that the new glue now behaves as a heat-hardening plastic. After a suitable lapse of time under such heat treating, the product is removed from the oven and thus I obtain a fuselage or laminated body having the final strength and chemical stability of the fuselages now made with heated molds, and in fact the indications are that there is greater uniformity by reason of having the combined advantages of the cold inflator process and the hot resin-hardening process.

The time and temperature of heat treating is readily determined, for any given type of work and for any given type of my new glue, by those skilled in the art. This invention provides the decided advantage that heat may be uniformly applied by reason of the work being entirely out of contact with molds when heat-treating is taking place.

By comparison with usual cold setting glues it is found that the new material may be made slow in setting. Thus with the formula given above the glue may be applied as by brushing, spraying or the like, to the individual pieces and if these are not joined up within one hour and thirty minutes the results are still very satisfactory. This allows for efficient planning of the work on production of any scale. In fact where, by humidity control or required application of moisture to the glue line, the work has been delayed for as much as ten to twelve hours the product still produces a good bond after heat treating.

The presence of the phenolic material and the added water seems to retard the setting of the cold glue. This is no doubt due to the fact that cold glues alone give up water to the wood and then begin to dry more rapidly whereas the cold glue in this case is dispersed in a phenolic solution that tends to remain at the surface until the thermal action is promoted.

Again I employ a composition consisting of 100 parts of the phenolic resin, and equal amount of water and 200 parts of cold glue, or twice as much cold glue. This latter product is used where a faster initial set is required while the product is substantially heat hardened. I find this product well suited for finishing surfaces such as by first brushing or spraying the surface to be finished, then allowing only twenty to thirty minutes for air setting and then pressing hot plates against the surface. If this hot treatment of the surface is carried out immediately after the cold set has taken place a temperature of from 240 degrees F. to 270 degrees F. will with ten to twenty minutes application give a mirror-bright finish. This finishing material may however, be used without the hot plate treatment by first applying the composition, then allowing a longer period such as thirty minutes for air setting, and then heat treating at a lower temperature such as 190 degrees F. and then sanding the hardened surface.

In both of the above mentioned compositions it will be seen that notwithstanding 50% or more cold setting glue by weight, the compositions are still cold setting and heat hardened and combine the advantages of both types of glue; the one ingredient not interfering finally with the other but actually improving the other. The phenolic element gives to the cold glue the advantage of time control as to setting, while the cold glue without interfering with the final heat hardening property of the phenolic element actually improves the same by acting as a means for holding the contacting members under the compressive stress essential to a strong heat-treatment bond and permits of applying heat to the work much more uniformly than where the work lies in contact with heated molds thruout.

I have also found that I may reduce the cold glue to the extent where it is less by weight than the phenolic resin; the result being an extremely slow air-setting product which nevertheless is responsive to final heat treatment, and such a composition is cited to show that within certain limits phenolic resins may retain heat hardening properties in the presence of air setting glue.

In fact the proportions in which the two may be used indicates there may be some molecular ratios involved altho I am not prepared to say that initial mixing, or time, or final application of heat results in a true chemical reaction. It is possible however that a phenyl-urea condensation product results and this disclosure suggests to those skilled in the chemical arts, the possibility of producing this composition by means other than the admixture of a phenol-aldehyde condensation product, a urea-aldehyde condensation product, and water.

It is possible that the final product after drying and heat treatment may be equal to a condensation product of carbanilide or carbazide or even a semicarbazide and that the product of my invention may be obtained as a condensation product of urea and aniline with an aldehyde. Again the results suggest that a synthetic or natural resin of benzoic nature may be treated with a nitrogenous or ammoniacal compound to produce an air-setting heat-hardening glue.

However, the invention is the result of a search for a heat hardening highly stable bond which unlike the usual heat-hardening resins would be originally tacky and take an initial set such as to lower the cost of manufacture of forms and bodies of the aforesaid type and such as would permit of careful and accurate assembly of parts away from molds to an extent that the parts to be finally heat-treated are permanently held under the required compressive stress prior to and while being thermally treated. As compared with casein glue for example, the strength of a joint produced by my method prior to heat treating is slightly stronger while when final heat treatment is carried out tests show the bond to be practically double that of the best casein bond while the resistance to heat and elements is characteristic of joints made with the phenolic resins and the hot press method and more uniform by reason of better control of the application of heat.

In the foregoing I have been specific as to formulae, time, temperature and the like but only by way of providing a practical disclosure and not with intent to limit the scope of the invention. As an example of various modifications I find it practical to move the assembled fuselage into the oven immediately after assembly; the cold glue taking the initial set quickly while the mass is being brought up to the temperature required for hardening the phenolic resin. Again the assembled fuselage may remain cold for an interval of time sufficient to allow the cold glue to set to an extent that the straps may be removed before the assembly is heated.

I claim:

1. The herein described method for joining materials in mass production which consists in applying to corresponding surfaces thereof a compatible intimate mixture of heat-hardening glue and cold-setting glue proportioned to permit of the surfaced materials being held in process for appreciable time intervals, then joining up corresponding pieces of the material with corresponding surfaces in contact, then imposing pressure on joined pieces until the cold glue shall have set to provide a maintained compressive stress at the corresponding surface, then releasing the pressure, then machining or otherwise treating the resultant product as required preparatory to final heat-hardening of the glue, and finally subjecting the joined materials to heat thereby setting the heat-hardening glue.

2. The method as in claim 1 and further consisting in subjecting the joined pieces to heat by circulating a gaseous medium over same.

3. The herein described method for manufacturing a hollow curved surface body such as an airplane fuselage, the method consisting in providing a plurality of material strips to be laminated to produce the body, coating surfaces thereof with a mixture of cold-setting glue and heat-hardening glue; joining-up the coated strips to produce a plurality of body sections, subjecting each section to pressure to promote final setting of the cold-setting glue while the strips are disposed in characteristic form to produce the required shape when the cold-setting glue has set, then releasing the pressure; then joining the body sections one to the other with such a mixture allowing the joined-up body sections to set cold thereby producing the body, and then subjecting the body as a whole to heat until said heat-hardening glue has set to form a permanent bond between said sheets and between said sections.

4. The method as in claim 3 and further consisting in subjecting the body to heat by circulating a heated gaseous medium uniformly over all exposed surfaces thereof while said body remains apart from other objects and retains its shape by virtue of the cold-setting glue.

5. The method as in claim 3 and in which the cold-setting glue is of the urea type and the heat-hardening glue is of a phenolic type adapted for airplane construction.

6. The hereindescribed method for fabricating a laminated wood body, the method consisting in providing the multiplicity of required individual pieces of wood, applying to surfaces thereof a coating of a mixture of cold-setting glue and heat-hardening glue, joining up the pieces to form a plurality of body sections and reenforcements respectively, subjecting each resultant product to pressure while in characteristic shape until the cold-setting glue shall have suitably set, then releasing the pressure, then finishing certain surfaces of the various products of the aforesaid steps whereby they may be closely fitted one to the other to produce a substantially complete integral body, then coating the surfaces of the products where they are to abut one another with a mixture of cold-setting glue and heat-hardening glue, then joining up the several products to form the complete body and constraining them while the cold glue sets to form the complete body, and then heat-treating the complete body to harden the heat-hardening glue.

7. A method of forming a laminated wood structure comprised of a plurality of wooden sheets, including the steps of: superimposing said wooden sheets in engagement with each other with a film containing cold-setting glue of the urea resin type and a heat-setting glue of the phenolic resin type between said wooden sheets; applying pressure to clamp said wooden sheets together in pressure engagement; maintaining said pressure on said wooden sheets until said cold-setting glue has set to form a bond between said wooden sheets; removing said pressure from said wooden sheets; machining said sheets while the same are held together by said cold-setting glue; and applying heat to said wooden sheets to cause said heat-setting glue to set to form a permanent bond therebetween.

8. A method of adhesively uniting separate bodies of material, including the steps of: placing said bodies in contact with each other with a film containing a cold-setting glue of the urea resin type and a heat-setting glue of the phenolic resin type between said bodies; applying pressure to said bodies to hold the same together until said cold-setting glue has set; removing said pressure from said bodies; carrying out a required finishing operation on said bodies while the same are held together by said cold-setting glue; and applying heat to said bodies so as to cause said heat-setting glue to set to form a permanent bond between said bodies.

REGINALD A. POWELL.